March 10, 1931. W. H. EDWARDS 1,795,389
SELECTIVE RINGING SYSTEM
Filed Feb. 15, 1930
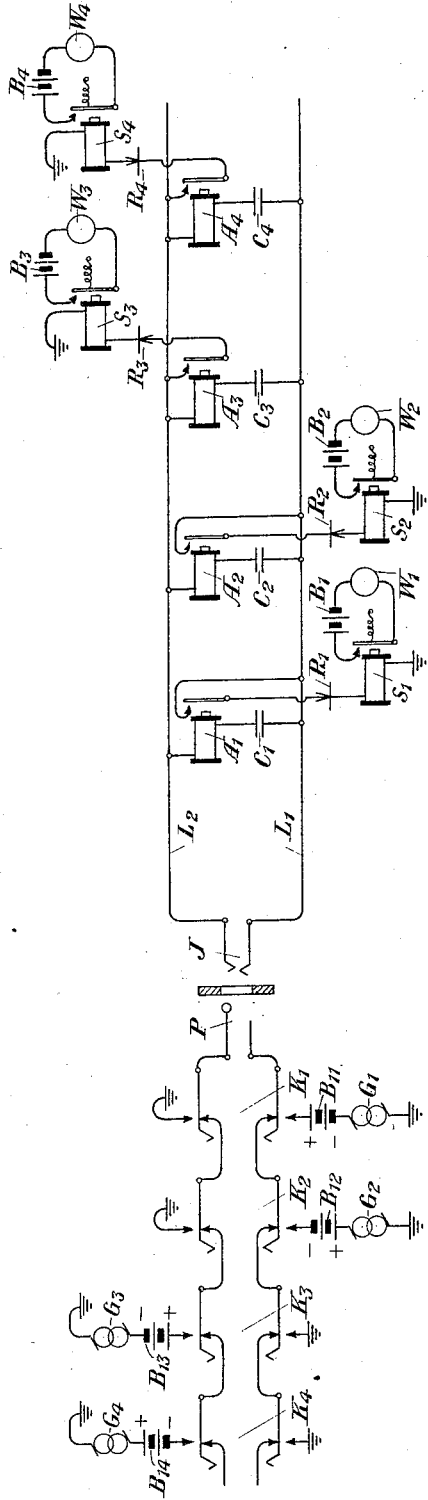
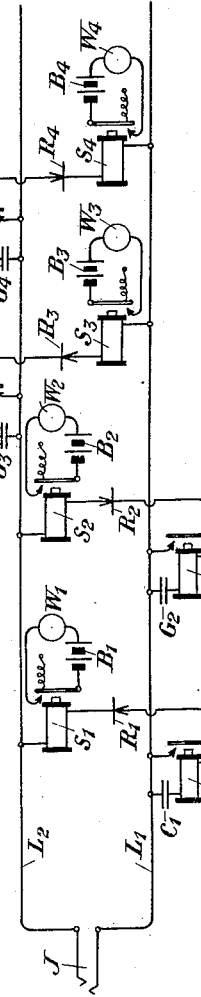
INVENTOR
W. H. Edwards
BY
ATTORNEY Patented Mar. 10, 1931

1,795,389

UNITED STATES PATENT OFFICE

WILLIAM H. EDWARDS, OF GREAT NECK, NEW YORK, ASSIGNOR TO AMERICAN TELEPHONE AND TELEGRAPH COMPANY, A CORPORATION OF NEW YORK

SELECTIVE RINGING SYSTEM

Application filed February 15, 1930. Serial No. 428,815.

This invention relates to signaling systems, and more particularly to multi-party selective ringing systems.

The principles of this invention will be understood from the following description, when read in connection with the accompanying drawing in which Figure 1 represents one embodiment of the invention, Figs. 1a and 1b represent curves characteristic of the current transmitted over a line for ringing purposes, and Fig. 2 represents another embodiment of the invention.

In Fig. 1 of the drawing the reference characters $L_1$ and $L_2$ represent a pair of lines or a cord circuit arranged for selectively ringing four subscribers of a telephone system. The lines $L_1$ and $L_2$ are bridged by four similar circuits which are in parallel relationship with each other, each including an alternating current relay and a condenser in series relationship. The relays are designated $A_1$, $A_2$, $A_3$ and $A_4$, and the condensers are designated $C_1$, $C_2$, $C_3$ and $C_4$. When alternating current flows through the windings of these relays, their armatures are attracted and close their associated contacts and these armatures stay closed against these contacts during the impression of such current. The condensers prevent direct current from passing through the windings of these relays.

The armatures of relays $A_1$ and $A_2$ connect rectifiers $R_1$ and $R_2$ to ground through the windings of two slow release, non-polarized relays $S_1$ and $S_2$, respectively. The armatures of relays $A_3$ and $A_4$ connect rectifiers $R_3$ and $R_4$ to ground through two other slow release, non-polarized relays $S_3$ and $S_4$, respectively. Rectifiers $R_1$, $R_2$, $R_3$ and $R_4$ may be of any well known type, preferably of a copper oxide type well understood in the art.

When the relays $S_1$, $S_2$, $S_3$ and $S_4$ are operated, the armatures of these relays are each connected in series with a circuit which includes a battery or source of direct current and a loud sounding ringer, the various sources of direct current being indicated by the reference characters $B_1$, $B_2$, $B_3$ and $B_4$ and the loud sounding ringers $W_1$, $W_2$, $W_3$ and $W_4$, respectively.

The lines $L_1$ and $L_2$ terminate in a jack J. A plug P, which may engage the jack J, is connected to a plurality of keys $K_1$, $K_2$, $K_3$ and $K_4$. The lower sides of keys $K_1$ and $K_2$ may be connected to ground through batteries $B_{11}$ and $B_{12}$ and generators $G_1$ and $G_2$, respectively. The upper sides of these keys may each be connected to ground. The upper sides of keys $K_3$ and $K_4$ may be connected to ground through batteries $B_{13}$ and $B_{14}$ and generators $G_3$ and $G_4$, respectively, while the lower sides of the latter keys may each be connected to ground.

Upon the operation of any one of the keys shown in the drawing, a battery and a generator will be connected to one side of the key operated so as to produce a direct current upon which alternating current is superimposed. The operation of either key $K_1$ or key $K_3$ will produce a current having the wave form shown in Fig. 1a, while the operation of either key $K_2$ or key $K_4$ will produce a somewhat similar current having the wave form shown in Fig. 1b. The currents produced by the operation of either key $K_1$ or key $K_2$ will be impressed upon the line $L_1$, while the current produced by the operation of either key $K_3$ or key $K_4$ will be impressed upon the line $L_2$. The wave form shown in Fig. 1a is one in which the length of each positive pulse is considerably greater than the length of each negative pulse, and in which the maximum positive potential is substantially greater than the maximum negative potential. In connection with the wave form shown in Fig. 1b, it is to be noted that the length of each positive pulse is considerably shorter than the length of each negative pulse, and moreover the maximum negative potential is substantially greater than the maximum positive potential.

It will be apparent that the curves shown in Figs. 1a and 1b represent sinusoidal waves biased by direct current. In Fig. 1a the curve representing current variation is derived from an arrangement by which the positive side of the source of direct current is connected to the corresponding line, and the wave shown in Fig. 1b is derived from an arrangement connecting the negative side of the source of direct current to the corresponding line. It is to be noted that keys $K_1$ and $K_2$ impress the currents derived from sources $B_{11}$ and $G_1$ and sources $B_{12}$ and $G_2$, respectively, between line $L_1$ and ground and that keys $K_3$ and $K_4$ impress the currents derived from sources $B_{13}$ and $G_3$ and sources $B_{14}$ and $G_4$, respectively, between line $L_2$ and ground. The sources $G_1$, $G_2$, $G_3$ and $G_4$ may be any alternating current generators well known in the art and these may produce current of the same frequency which is preferably quite low, for example, 20 cycles.

Upon the operation of any one of the keys, all of the relays $A_1$, $A_2$, $A_3$ and $A_4$ will immediately operate and their armatures will close the associated contacts. These relays will remain operated while any one of the keys remains closed. All of these relays simultaneously release their armatures when no one of the keys remains in its operated condition. When no ringing current flows over either line $L_1$ or line $L_2$ the grounded circuits, which include the rectifiers $R_1$, $R_2$, $R_3$ and $R_4$ and the corresponding slow release relays, will be opened, and consequently the impedance from each line to ground will be a maximum, thereby tending to eliminate interference with speech signals arising from inductive disturbances.

Upon the operation of key K, a current pulse of positive polarity and considerable amplitude will flow through the rectifier $R_1$ in its conducting direction and the rectifier will present very little resistance to such current. Many such pulses will be successively produced and will be separated from each other by very brief time intervals. The armature of the relay $S_1$ will be attracted by a magnetic field which exceeds the retractive power of the spring tied to its armature. Following each relatively long pulse of positive polarity, a voltage of negative polarity will be briefly impressed on the line $L_1$. Since such current will tend to flow in the direction in which the rectifier presents a very high resistance, the amplitude of the current will be practically negligible. Due to the fact that relay $S_1$ is of the slow release type, its armature will remain closed against its associated contact throughout the period that the key $K_1$ remains operated. The closure of the contact of relay $S_1$ will operate the loud sounding ringer $W_1$ which will be connected in series with battery $B_1$ and the armature of relay $S_1$. The ringer $W_1$ will remain operated as long as key $K_1$ remains closed.

While key $K_1$ remains closed, pulses of current of positive polarity will tend to flow through the rectifier $R_2$ and through the winding of relay $S_2$. Since the rectifier is poled in a direction opposite to that of rectifier $R_1$, even though the applied potential is relatively high, the current flowing through the winding of relay $S_2$ will be small in comparison with the current simultaneously flowing through the winding of relay $S_1$. Following each of these, there will be a short pulse of negative polarity and of small potential, which will pass through the winding of relay $S_2$ and the rectifier $R_2$ in its conducting direction. None of these pulses will be sufficient to overcome the retractive power of the spring tied to the armature of relay $S_2$, and, therefore, the ringer device $W_2$ will not be operated.

When the key $K_2$ is closed, pulses of direct current of considerable amplitude will flow through the rectifier $R_2$ in its conducting direction and through the winding of relay $S_2$. All of these pulses will be separated from each other by pulses of current of negligible amplitude and opposite polarity which flow through the rectifier $R_2$ in the non-conducting direction. Each of the pulses of larger amplitude will produce a magnetic field sufficiently great to overcome the holding power of the spring of the relay $S_2$. The armature of this relay will, therefore, close its associated contact and by virtue of the slow release property of the relay $S_2$, the armature will remain closed against its contact while key $K_2$ remains closed. Such pulses of direct current as simultaneously traverse the winding of relay $S_1$ will be insufficient to cause that relay to become operated.

Similarly, when key $K_3$ is closed, current from battery $B_{13}$ and generator $G_3$ will operate relay $S_3$ and ringer $W_3$ will be sounded. Relay $S_4$ will not be operated while key $K_4$ remains open. Upon the closure of key $K_4$, however, the relay $S_4$ will become operated, sounding the ringer $W_4$, but the closure of key $K_4$ will not cause the relay $S_3$ to become operated.

The arrangement shown in Fig. 1 of the drawing may be used for semi-selectively operating ringing circuits for eight subscribers. Eight alternating current relays, each similar to relay $A_1$, may be connected, respectively, in series with eight condensers, each similar to condenser $C_1$, and all of these relays and condensers will be connected between the lines $L_1$ and $L_2$. Four additional circuits each controlled by an armature of one of the alternating current relays will be connected to ground through a properly poled rectifier and a slow release relay, as shown in the drawing for four-party selective operation. Each slow release relay will control a circuit including a source of direct current and a ringing device. In this semi-selective arrangement, each key may be operated a different number of times in accordance with a predetermined code so as to distinguish a ringing current to one subscriber from that to another.

Fig. 2 of the drawing shows the lines $L_1$ and $L_2$ connected to apparatus including elements similar to those shown in Fig. 1 and designated by the same reference characters. The windings of the alternating current relays $A_1$ and $A_2$ are connected between ground and line $L_1$ through condensers $C_1$ and $C_2$, respectively. The windings of the alternating current relays $A_3$ and $A_4$ are similarly connected between ground and the line $L_2$ through condensers $C_3$ and $C_4$, respectively. The armatures of the various alternating current relays connect the windings of the slow release relays $S_1$, $S_2$, $S_3$ and $S_4$ in series with rectifiers $R_1$, $R_2$, $R_3$ and $R_4$, respectively, across the lines $L_1$ and $L_2$. The windings of the relays $S_1$, $S_2$, $S_3$ and $S_4$ control armatures which operate ringers or gongs $W_1$, $W_2$, $W_3$ and $W_4$ connected in series with batteries $B_1$, $B_2$, $B_3$ and $B_4$, respectively.

The currents which energize relays $A_1$ and $A_2$ flow over line $L_1$ and through condensers $C_1$ and $C_2$, respectively, and ground. Those currents which energize relays $A_3$ and $A_4$ flow over line $L_2$ through condensers $C_3$ and $C_4$, respectively, and ground. Whenever either key $K_1$ or key $K_2$ becomes closed, both relays $A_1$ and $A_2$ will become simultaneously operated. The relays $A_3$ and $A_4$ will be simultaneously operated whenever key $K_3$ or key $K_4$ becomes closed. The relays $S_1$, $S_2$, $S_3$ and $S_4$ will be effectively operated by current flowing through the respective rectifiers only when the corresponding key has been closed.

While this invention has been shown in certain particular arrangements merely for the purpose of illustration, it will be understood that the general principles of this invention may be applied to other and widely varied organizations without departing from the spirit of the invention and the scope of the appended claims.

What is claimed is:

1. A multi-party ringing system including a line, a plurality of alternating current relays connected in parallel relationship across said line, a plurality of rectifiers, and a plurality of slow release relays each connected in series with one of said rectifiers and controlled by the armature of one of said alternating current relays.

2. A multi-party ringing system including a line, means for impressing alternating current superimposed on direct current on said line, a plurality of alternating current relays connected in parallel relationship across said line, a plurality of rectifiers one corresponding to each alternating current relay, a plurality of slow release relays one corresponding to each alternating current relay, and means whereby each rectifier and the corresponding slow release relay will be effectively connected in series with each other and with one side of said line.

3. A ringing circuit for a telephone line including an alternating current relay, a condenser connected in series with said alternating current relay and the telephone line, a rectifier, a slow release relay connected in series with said rectifier and with the armature of the alternating current relay, the contact of the alternating current relay being connected to one side of the telephone line, and an indicating device controlled by the armature of the slow release relay.

4. The combination of a telephone line, a source of direct current, a source of alternating current connected to one side of said line in series with said source of direct current, an alternating current relay, a condenser connected in series with said alternating current relay across said telephone line, a rectifier, and a slow release relay connected to one side of said telephone line through said rectifier and the armature and contact of the alternating current relay.

5. A multi-party ringing system capable of four distinct selections comprising a two-wire line, four alternating current relays connected in shunt across said line one corresponding to each party, four rectifiers, and four slow release relays one corresponding to each rectifier, two of said rectifiers being oppositely poled and connected in series with the windings of the corresponding slow release relays to one of the wires of said line, the other two of said rectifiers being oppositely poled and connected in series with the windings of the corresponding slow release relays to the other wire of said line.

6. A four-party signaling system comprising a two-wire line, a source of direct current, a source of alternating current, four alternating current relays connected in shunt across said line, four rectifiers, four slow release relays one corresponding to each rectifier, two of said rectifiers being oppositely poled and connected in series with the winding of the corresponding slow release relays to one of the wires of said line, the other two of said rectifiers being oppositely poled and connected in series with the windings of the corresponding slow release relays to the other wire of said line, and means for impressing the direct current superimposed by the alternating current upon said line for selectively operating said slow release relays.

In testimony whereof, I have signed my name to this specification this 14th day of February, 1930.

WILLIAM H. EDWARDS.